United States Patent
Hassen

(10) Patent No.: US 9,739,510 B2
(45) Date of Patent: Aug. 22, 2017

(54) FLOW-SYNCHRONOUS FIELD MOTION REFRIGERATION

(76) Inventor: Charles N. Hassen, Tucson, AZ (US)

( * ) Notice: Subject to any disclaimer, the term of this patent is extended or adjusted under 35 U.S.C. 154(b) by 554 days.

(21) Appl. No.: 13/261,218

(22) PCT Filed: Sep. 17, 2010

(86) PCT No.: PCT/US2010/002534
§ 371 (c)(1),
(2), (4) Date: May 18, 2012

(87) PCT Pub. No.: WO2011/034594
PCT Pub. Date: Mar. 24, 2011

(65) Prior Publication Data
US 2012/0222427 A1    Sep. 6, 2012

Related U.S. Application Data

(60) Provisional application No. 61/276,895, filed on Sep. 17, 2009.

(51) Int. Cl.
*F25B 21/00* (2006.01)
*F25B 30/00* (2006.01)

(52) U.S. Cl.
CPC .............. *F25B 21/00* (2013.01); *F25B 30/00* (2013.01); *F25B 2321/001* (2013.01); *F25B 2321/002* (2013.01); *Y02B 30/52* (2013.01); *Y02B 30/66* (2013.01)

(58) Field of Classification Search
CPC ............... F25B 21/00; F25B 2321/001; F25B 2321/002; F25B 30/00; F25B 2321/0021; Y02B 30/123; Y02B 30/66; Y02B 30/52
USPC ............................................. 62/3.1
See application file for complete search history.

(56) References Cited

U.S. PATENT DOCUMENTS

| | | | |
|---|---|---|---|
| 3,638,440 A | 2/1972 | Lawless | |
| 4,069,028 A | 1/1978 | Brown | |
| 4,332,135 A | 6/1982 | Barclay et al. | |
| 4,408,463 A | 10/1983 | Barclay | |
| 4,507,928 A | 4/1985 | Johnson | |
| 5,182,914 A | 2/1993 | Barclay et al. | |
| 5,357,756 A | 10/1994 | Lubell | |
| 6,332,323 B1 | 12/2001 | Reid et al. | |
| 6,526,759 B2 | 3/2003 | Zimm et al. | |
| 6,668,560 B2 | 12/2003 | Zimm et al. | |
| 6,877,325 B1 * | 4/2005 | Lawless | 62/3.1 |

(Continued)

OTHER PUBLICATIONS

Zimm et al., "Design and Performance of a Permanent-Magnet Rotary Refrigerator", International Journal of Refrigeration, 29 (2006) 1302-1306.

(Continued)

*Primary Examiner* — Len Tran
*Assistant Examiner* — Ana Vazquez
(74) *Attorney, Agent, or Firm* — William R Bachand

(57) ABSTRACT

An improved method to manage the flow of heat in an active regenerator in a magnetocaloric or an electrocaloric heat-pump refrigeration system, in which heat exchange fluid moves synchronously with the motion of a magnetic or electric field. Only a portion of the length of the active regenerator bed is introduced to or removed from the field at one time, and the heat exchange fluid flows from the cold side toward the hot side while the magnetic or electric field moves along the active regenerator bed.

7 Claims, 8 Drawing Sheets

(56) References Cited

U.S. PATENT DOCUMENTS

| | | | |
|---|---|---|---|
| 2002/0040583 A1 | 4/2002 | Barclay et al. | |
| 2006/0144048 A1 | 7/2006 | Schulz | |
| 2007/0130960 A1 | 6/2007 | Muller et al. | |
| 2007/0144181 A1* | 6/2007 | Kitanovski et al. | 62/3.1 |
| 2008/0143214 A1 | 6/2008 | McNamara et al. | |
| 2008/0236173 A1* | 10/2008 | Shin et al. | 62/3.1 |
| 2008/0314049 A1 | 12/2008 | Shin et al. | |
| 2009/0053632 A1* | 2/2009 | Ishii et al. | 430/48 |
| 2009/0217674 A1* | 9/2009 | Kaji et al. | 62/3.1 |
| 2009/0308079 A1* | 12/2009 | Lee | F25B 21/00 |
| | | | 62/3.1 |
| 2011/0016885 A1* | 1/2011 | Zhang et al. | 62/3.1 |

OTHER PUBLICATIONS

Kuz'min, "Factors Limiting the Operation Frequency of Magnetic Refrigerators", Appl. Phys. Lett., 90, 251916 (2007).

Neese et al., "Large Electrocaloric Effect in Ferroelectric Polymers", Science, 321 (2008) 821-823.

Gschneidner, Jr. et al., "Thirty Years of Near Room Temperature Magnetic Cooling: Where We Are Today and Future Prospects", Int. Journal of Refrigeration, 31 (2008) 945-961.

* cited by examiner

FLOW-SYNCHRONOUS FIELD MOTION REFRIGERATION

CROSS-REFERENCE TO RELATED APPLICATIONS

This application claims the benefit of U.S. Provisional Application No. 61/276,895, filed Sep. 17, 2009, incorporated herein by reference.

STATEMENT OF GOVERNMENT RIGHTS

This invention was made in part with US Government support under Small Business Innovative Research (SBIR) Department of Energy Contract No. DE-FG02-07ER84943. The Government has certain rights in the invention.

FIELD OF THE INVENTION

This invention pertains to the field of magnetocaloric or electrocaloric refrigeration, and to the use of active regenerators. More specifically, this invention relates to methods for management of the flow of heat exchange fluid in heat pumps employing active regenerators, to enhance performance and reduce the cost of such devices.

BACKGROUND OF THE INVENTION

The magnetocaloric effect, or MCE, is a property of certain materials, as a result of which property those materials change their temperature when subjected to a change in the magnetic field in which they operate. A related effect known as the electrocaloric effect, or ECE, occurs when certain polar materials, such as ferroelectric polymers are exposed to high electric field strengths. Materials with a "positive" MCE or ECE get hotter as the field increases, and materials with a "negative" MCE or ECE get colder as the field increases.

The MCE and the ECE both are now the subject of intensive research and development to produce refrigerators that employ the effect, using materials that demonstrate large MCE or ECE response as solid refrigerants. Such refrigerators hold the promise of greater thermodynamic efficiency than vapor compression refrigerators, and the elimination of use of such potentially harmful chemicals as CFC's for the working vapor compression fluid.

This process works efficiently, since the release and absorption of heat with the change in magnetic or electric field is a nearly reversible process. However, because the absolute value of the temperature change due to this effect is small compared to the typical requirements for commercially useful refrigeration, there exists a need, as described, for example, in U.S. Pat. No. 4,069,028 by Brown for a method to physically separate the processes of absorbing heat at cold temperature and rejecting heat at hot temperature.

An active regenerator, is the means by which scientists and engineers have overcome the low magnitude of the temperature change due to the MCE. U.S. Pat. No. 4,332,135, for example, by Barclay et al. teaches the use of an active regenerator to apply Brayton, Stirling, Ericson, and Carnot cycles by application of an active regenerator. Heat is taken in to the active regenerator at the cold side from the cold side heat exchanger, and heat is removed from the active regenerator at the hot side, through a hot side heat exchanger. Although researchers are only beginning to build devices for ECE applications, there are many different designs so far reduced to practice for MCE refrigerators, some with single active regenerator units or multiple active regenerator units; some move the active regenerator into and out of a stationary magnetic field; some move the magnet instead and keep the active regenerator stationary. Several rotary designs exist, including one described by Brayton in U.S. Pat. No. 4,408,463 in which heat exchange fluid moves radially through a regenerative magnetic wheel, and a more recent design by Zimm et al. as described in U.S. Pat. No. 6,526,759 in which the heat exchange fluid moves circumferentially through the wheel as it rotates through a stationary permanent magnetic field. In U.S. Pat. No. 4,507,928 Johnson describes the use of a continuously reciprocating displacer with at least a pair of active regenerator segments driven into and out of a magnetic field. There are a few designs in which the magnet field source—which could be a conventional or superconducting electromagnet or a sophisticated permanent magnet assembly such as described in U.S. Pat. No. 5,182,914—does not move physically with respect to the stationary active regenerator, but instead increases and decreases the magnetic field amplitude.

One significant drawback to the conventional methods of using MCE in an active regenerator is that a physically large magnetic field must be employed to raise or lower the entire temperature profile along the whole active length of said active regenerator. Because the magnetic fields needed to produce a useful effect are quite powerful, the cost, size and weight of the magnet in a typical magnetic refrigerator design can be the dominant element in the overall cost, size and weight of the refrigerator. Thus it is one object of the instant invention to provide a design for a magnetic refrigerator that minimizes the size and cost of the magnet or magnets required to obtain the desired cooling power. It is a further object of the instant invention to provide a magnetic refrigerator that can achieve a greater transfer of heat per cycle of the refrigerator than is possible in prior art designs. It is a further object of the instant invention to provide a magnetic refrigerator that can attain a larger temperature differential between the cold side heat exchanger and the hot side heat exchanger than is possible in prior art designs.

SUMMARY OF THE INVENTION

The invention described herein provides an improved method to manage the flow of heat in an active regenerator in a magnetocaloric or an electrocaloric heat pump refrigeration system, in which heat exchange fluid moves synchronously with the motion of a magnetic or electric field. The key difference between the prior art approach and the flow-synchronous field motion, or FSFM, is that in the instant invention only a portion of the length of the active regenerator bed is introduced to or removed from the field at one time, and the heat exchange fluid flows from the cold side toward the hot side while the magnetic or electric field moves in the same direction, but not necessarily the same rate, as the fluid along the active regenerator bed. In one implementation the magnetic or electric field raises the temperature of a quantity of heat exchange fluid, and then that same fluid moves downstream to the region of the active regenerator just ahead. The downstream adjacent region regenerator temperature is therefore a little hotter when the field reaches it, and so the final temperature it reaches upon application of the field increases.

The flow-synchronous field motion method in accordance with the present invention provides several important advantages over prior art in managing heat flow through the system: (1) The method provides improved range of useful temperature spans compared to conventional designs. (2) The method provides improved heat transfer per cycle of the refrigerator compared to conventional designs. (3) The method allows smaller magnet physical size relative to the active regenerator bed length compared to conventional designs, or for smaller electrode size to be employed in electrocaloric heat pumps operated on the same principle. (4) The magnet or electric field can move at a constant relative speed without stopping in position over the active regenerator bed, making this approach ideally suited for improving the simplicity, and hence lowering cost and increasing reliability, of rotary-style active regenerator or linear-style active regenerator beds, without compromising performance. (5) The transient period during which the system approaches its steady state temperature profile is shorter than for conventional magnetic refrigerators, or for electrocaloric refrigerators operated on the same principle. (6) The method employs a more efficient mode of "sharpening" the transition zone in temperature between the cold region and the hot region in the active regenerator bed.

Additionally, the improved management of heat flow through the system enabled by the present invention, is not limited in application to the conventionally designed active regenerator heat-pump refrigeration systems which operate cyclically and reversibly, requiring the direction of fluid flow through the regenerator to be reversed once per cycle. The flow-synchronous field motion method in accordance with the present invention may also be operated in a constant, non-reversing flow mode, which holds great promise as a basis for the design of modular heat pump stages that can in principle achieve much higher cooling and heating capacity than those based on reversing flow, and would be ideal for large scale industrial refrigeration systems.

Further objects, features and advantages of the instant invention will be apparent from the following detailed description, when considered in conjunction with the accompanying drawings.

DESCRIPTION OF PREFERRED EMBODIMENTS

Figure 1:
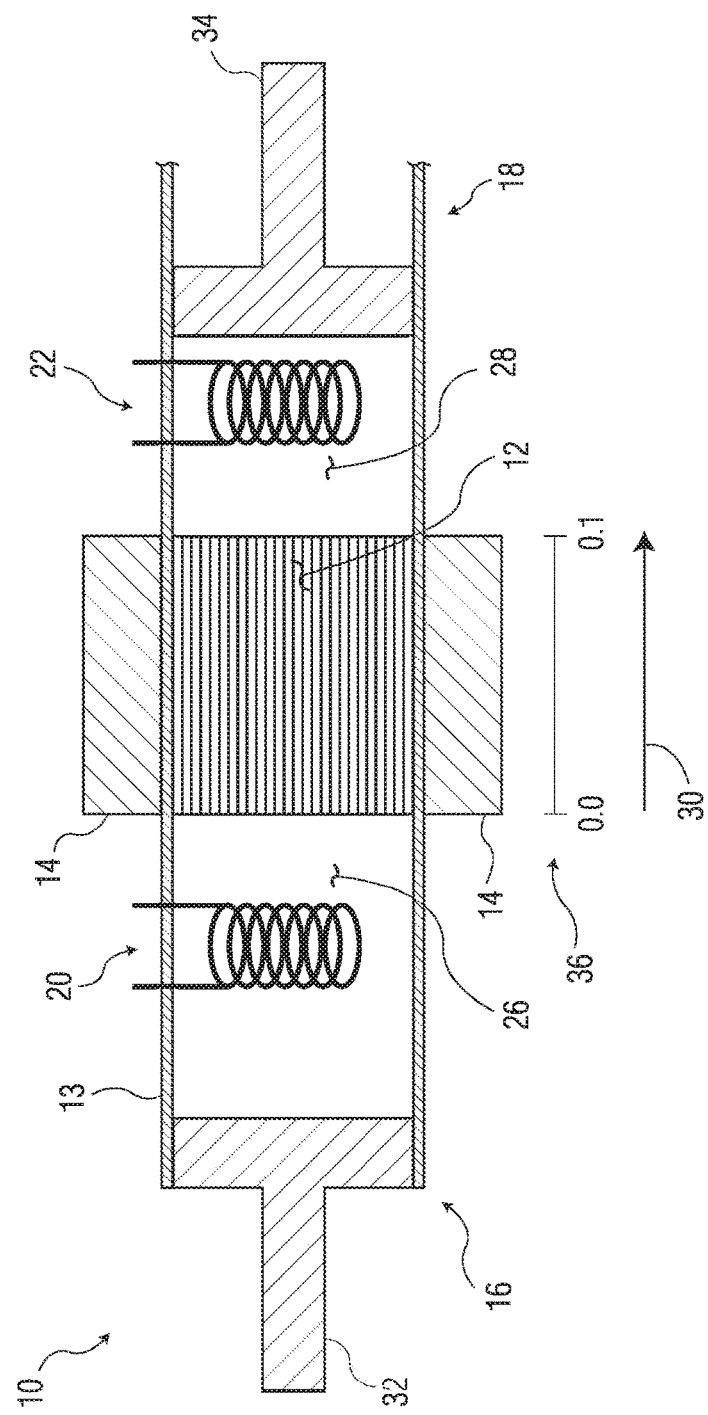
FIG. 1 shows a conventional single active magnetic regenerator (AMR) style magnetic refrigerator of the prior art.

The present invention provides an improved method to manage the flow of heat in an active regenerator in a magnetocaloric or an electrocaloric heat-pump refrigeration system. Such systems are well known in the art, and are exemplified by the design 10 shown in FIG. 1, employing a conventional single active magnetic regenerator (AMR) 12 comprising magnetocaloric regenerator material, such as gadolinium, encased within a housing 13 and having a magnetic field source 14, such as a permanent magnet or an electromagnet, positioned exterior of the housing. The regenerator has a cold end 16 (to the left in the drawing) and a hot end 18 (to the right in the drawing), with a cold-side heat exchanger (CHEX) 20 adjacent the cold end 16, and a hot side heat exchanger (HHEX) 22 adjacent the hot end 18. When heat exchange fluid 26 is pumped through the regenerator 12 from the cold end to the hot end, the magnetic field source 14 acts upon the magnetocaloric regenerator material and thereby increases its temperature and, in turn, the temperature of the heat exchange fluid 28 passing therethrough. The conventional system 10 is operated cyclically and reversibly, requiring the direction 30 of fluid flow through the regenerator to be reversed once per cycle, with the magnetic field source being applied in the forward stage only of each cycle. The forward stage of each cycle, beginning with the pistons 32 and 34 as shown, delivers a heated volume 28 of heat exchange fluid to the hot-side heat exchanger 22, while the reverse stage of each cycle, ending with pistons 32 and 34 as shown, delivers a cooled volume 26 of heat exchange fluid to the cold-side heat exchanger 20. By pumping heat from a load on the cold side to a heat sink on the hot side, the system 10 can operate as a refrigerator; while by pumping heat from a cold side heat source to a load on the hot side, the system 10 can operate as a heater.

In the improved method of operation in accordance with the present invention, the field source, of a length less than or equal to the length of the regenerator, moves lengthwise (i.e., along the extent of the regenerator in the direction of flow of heat exchange fluid) relative to the regenerator, or vice versa, with the field source acting upon only a portion of the regenerator material at one time, so as to subject the regenerator material to changing fields and thereby produce corresponding changes in the temperature of the regenerator material and the heat exchange fluid passing therethrough. At the same time, the heat exchange fluid is pumped through the regenerator in synchronous flow with the relative motion of the field source. The combination of the relative motion of the field source and the synchronous flow of the heat exchange fluid enables improved management of heat flow through the regenerator.

The flow-synchronous field motion method of the present invention has equal applicability to systems employing either a magnetocaloric regenerator or an electrocaloric regenerator. In the case of a magnetocaloric regenerator, the regenerator material will be magnetocaloric material, preferably gadolinium, and the field source will be a permanent magnet or an electromagnet providing a magnetic field. The relative movement of the magnet may be in linear motion relative to a linearly configured regenerator comprising at least one segment, or in which the regenerator moves in linear motion relative to the magnet. Alternatively, the relative movement of the magnet may be in rotary motion relative to a circularly configured regenerator comprising at least one segment arranged as a partial ring with a center of curvature coincident with the axis about which the relative rotary motion occurs, or in which the regenerator moves in rotary motion relative to the magnet.

Likewise, in the case of an electrocaloric regenerator, the regenerator material will be electrocaloric material, preferably a ferroelectric polymer, and the field source will be an electrode or series of electrodes providing an electric field. The series of electrodes may be, for example, a multiplicity of electrically and physically isolated electrodes, each of which is independently switchable.

In any case, the field source is advantageously of a length less than the length of the regenerator so as to minimize the size and cost of the system.

The heat exchange fluid employed in the system will typically be water, or a combination of water and another material, such as alcohol or antifreeze, introduced to extend the useful range of temperatures over which the heat pump may be applied.

The flow-synchronous field motion method in accordance with the present invention will provide varying effects within the system, depending upon the ratio of the heat exchange fluid velocity to the moving field source velocity. Thus, if the heat exchange fluid is pumped at a rate providing a non-zero fluid velocity that exceeds the moving field source translational velocity, it will provide a forward bias to the synchronous flow, so that changes in temperature of the heat exchange fluid accumulate hot heat exchange fluid in front of the moving field source, and cold heat exchange fluid on the trailing edge of the moving field source. If the heat exchange fluid is pumped at a rate providing a non-zero fluid velocity that is approximately equal to the moving field source translational velocity, it will provide a neutral bias to said synchronous flow, so that changes in temperature of the heat exchange fluid accumulate hot heat exchange fluid near the leading edge of the moving field source, and cold heat exchange fluid behind the trailing edge of the moving field source. And if the heat exchange fluid is pumped at a rate providing a non-zero fluid velocity that is slower than the moving field source translational velocity, it will provide a negative bias to said synchronous flow, so that changes in temperature of the heat exchange fluid accumulate hot heat exchange fluid in a zone trailing the leading edge of the moving field source, and accumulate cold heat exchange fluid in a zone on the trailing edge of the moving field source. One means for adequately controlling this ratio to produce the desired effect would be to have the heat exchange fluid move in small incremental steps executed sequentially in between small incremental steps in the position of the field source along the regenerator.

The improvement provided by the flow-synchronized field motion (FSFM) method of the present invention can readily be seen by comparing temperature profiles within the system with those of the conventional prior art system. FIGS. 2 through 6 illustrate schematically the sequential changes in temperature profile within the system 10 during conventional prior art operation of an AMR such as shown in FIG. 1.

Figure 2:
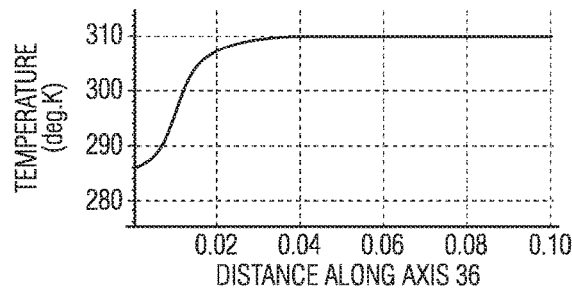
FIGS. 2 through 6 illustrate schematically the sequential changes in temperature profile within the system during conventional prior art operation of an AMR such as shown in FIG. 1.
Figure 3:
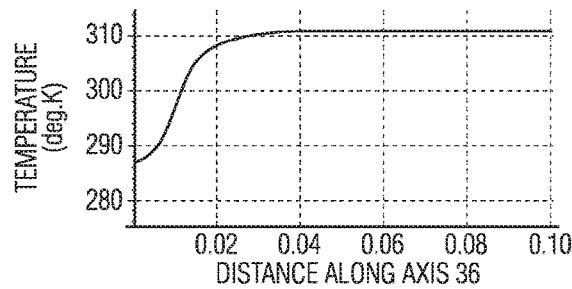

Initially there is a temperature profile along the length, reference axis 36. Length refers to the extent of the AMR in the direction 30 of flow of heat exchange fluid of the AMR that has been established as the equilibrium starting profile, with no magnetic field applied, as shown in FIG. 2. The axes in the figure are temperature on the vertical axis, and distance along the regenerator on the horizontal axis. With no fluid moving, the bed is subjected to an increase in the magnetic field, which causes the entire profile temperature to rise, as in FIG. 3.

Figure 4:
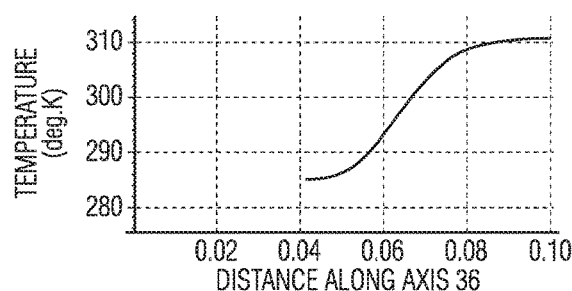

Next, without changing the magnetic field, heat exchange fluid is pumped through the system 10 from the cold side 16 to the hot side 18 as shown in FIG. 4, essentially pushing the plateau at the high temperature into the hot side heat exchanger, at a temperature that is hotter than the heat exchanger temperature. The fluid 26 that moves into the AMR bed 12 from the cold side 16 provides a low temperature plateau at the cold heat exchanger temperature, on the cold end of the AMR. This cold plateau is established under influence of the applied magnetic field.

Figure 5:
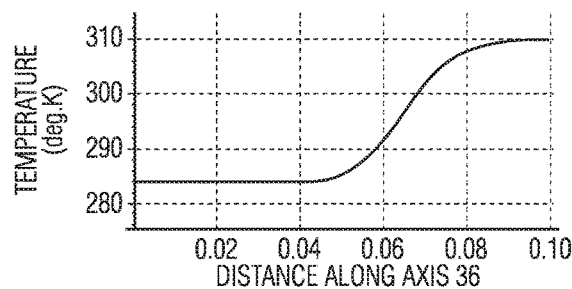
Figure 6:
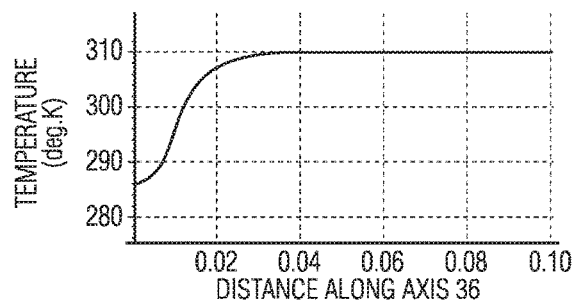
Figures 7A, 7B, 7C, 7D, 7E:
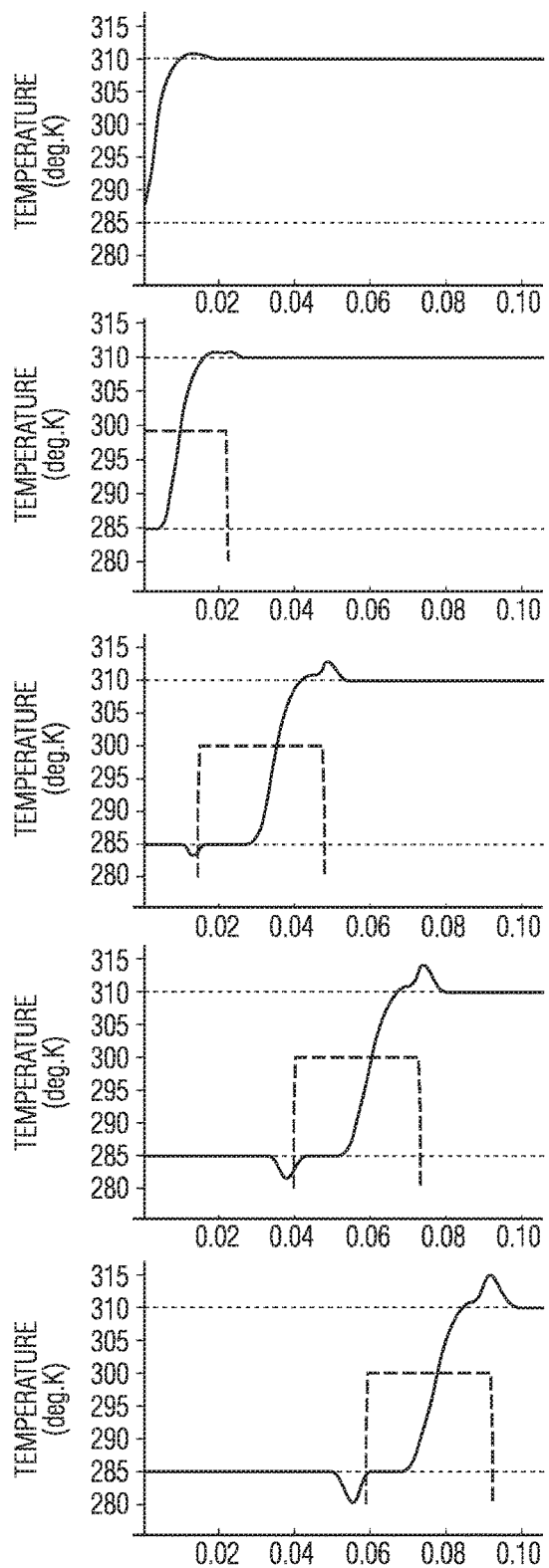
FIGS. 7A through 7J illustrate schematically in ten sequential views the changes in temperature profile within the system during operation of an AMR employing the flow-synchronous field motion method of the present invention, in cyclical, reversing flow mode.
Figure 7F:
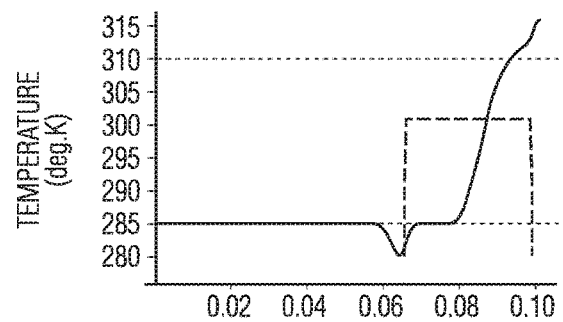
Figure 7G:
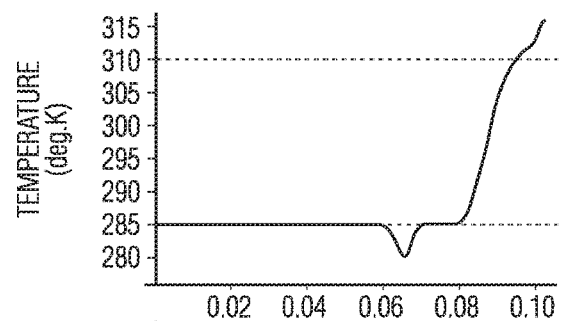
Figure 7H:
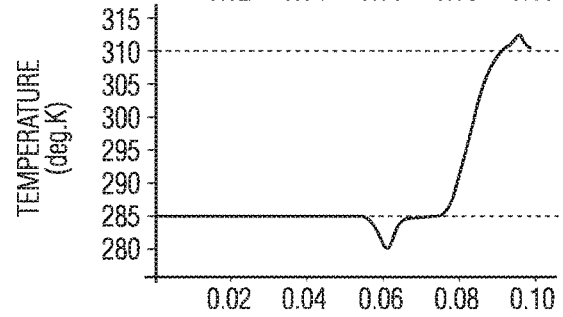
Figure 7I:
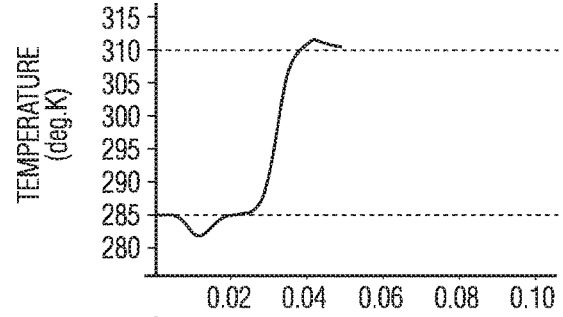
Figure 7J:
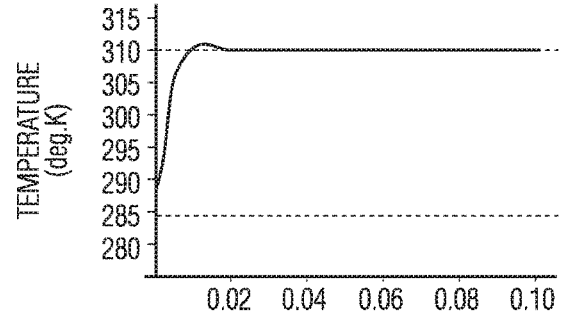

Then, the magnetic field is removed, producing a temperature drop in the bed 12, so the cold plateau drops uniformly along its length, providing a cooling effect, as shown in FIG. 5. The flow in the regenerator 12 is then restarted in a reversed direction, and hot fluid 28 moves into the regenerator bed 12 from the high temperature heat exchanger 22, while the newly cooled cold plateau is pumped into the cold heat exchanger 20, as shown in FIG. 6. Once the hot plateau has been re-established, flow into the cold heat exchanger 20 stops, and the cycle begins again.

Using a dynamic transient 1-dimensional numerical model (written in Mathematica Release 7.0) of a conventional style AMR refrigerator operating between the temperature range of 285° K to 310° K, with water as the heat exchange fluid, AMR bed mass equal to 0.316 kg gadolinium, and a fluid: regenerator cross-sectional area ratio of 1:2, we obtain the following results for the steady state solution illustrated (after allowing the model to run through 200 cycles): (1) Net heat removed from cold side per cycle: 94.6 joule; and (2) Net heat delivered to hot side heat exchanger per cycle: 97.9 joule.

In the idealized form of the conventional AMR design for magnetic refrigerators, flow of the heat exchange fluid occurs only when the magnetic field is stable; and conversely, if the magnetic field is changing, fluid flow is reduced to near zero. This means that conventional designs never change the temperature of the heat exchange fluid by an amount that is greater than the maximum isentropic temperature change. For example, as the magnetic field is applied between the temperature profiles shown in FIG. 2 and FIG. 3, the entire profile temperature rises. When the magnetic field is reduced, the entire temperature profile drops simultaneously.

The key difference between this conventional approach and the flow-synchronous field motion, or FSFM, approach is that in FSFM, only a portion of the length of the AMR bed is magnetized or de-magnetized at one time, and the heat exchange fluid flows from the cold side toward the hot side while the magnetic field moves along the AMR bed. This means that the magnetic field can raise the temperature of a quantity of heat exchange fluid (water in the case of the model system), and then that same fluid can move downstream to the region of the AMR just ahead. The upstream adjacent region regenerator temperature is therefore a little hotter when the magnet reaches it, and so the final temperature it reaches upon magnetization increases, producing a "snowball rolling uphill" type temperature growth effect.

An example possible embodiment FSFM cycle is shown in the 10 temperature profile snapshots of FIGS. 7A through 7J.

The model shown in FIGS. 7A through 7J employs the same mass of gadolinium regenerator material (0.316 kg gadolinium) as was used in the model for FIG. 2 through FIG. 6, and the peak magnetic field applied in both models is 1.5 tesla, a magnetic field that is near the limit of fields attainable by permanent magnet assemblies made from today's best-performing permanent magnets. Note that the temperature profile slope of the region between the low temperature plateau and the high temperature plateau is much steeper in the FSFM cycle compared to the conventional cycle. The bed length span for the temperature rise is roughly 4 cm out of the bed length of 10 cm in the conventional cycle profile, whereas it is only about 2 cm in the FSFM cycle profile. Also, the amount of heat moved per cycle between the same Told and Thor is about 35% greater than in the conventional design, at 134 joules per cycle.

From a practical and economic perspective, however, the most important aspect of the FSFM cycle is that the size and cost of the magnet required to produce the MCE temperature change is reduced (in this case by a factor of about ⅔). Also, it is possible to employ a much larger ratio of fluid volume to regenerator volume in a system operating on this principle, which improves the efficiency with which heat is transferred from the regenerator to the fluid and back. Having larger passageways for fluid to move through the AMR also means that frictional losses due to fluid flow through narrow channels will be reduced, which becomes more important as the frequency of operation increases. In a conventional AMR design, the usual ratio of fluid volume to regenerator volume with the AMR bed is about 1:2, for a porosity of roughly 33%. In an FSFM system employing gadolinium as the regenerator material, system performance increases noticeably up to a porosity of 80%. Most of the benefit of high porosity regenerator designs may be attained by using porosity of about 2:1 (67%) or 3:1 (75%).

A few aspects of the FSFM cycle illustrated in FIGS. 7A through 7J are worth noting: first observe how heat magnetically released from the regenerator is pushed into the region just ahead of the moving magnet (FIGS. 7B through 7F), thereby pre-heating the regenerator before the moving magnet increases the field to its peak value, so that there arises a body of fluid that has its temperature rise steadily as the magnet progresses from the cold side to the hot side. In this example, there is a period at the beginning of the cycle where the magnet moves with no fluid movement. Second, as the cold side fluid moves into the AMR and proceeds with a velocity that is just slightly greater than the velocity of the magnet, the cold fluid chills the already magnetized region of the AMR on the trailing edge of the magnet (FIGS. 7C through 7F). When the cooled regenerator material emerges from the trailing edge of the moving magnetic field, its temperature drops. Thus the system creates a "cold tail" and a "hot head" due to the synchronous motion of the fluid and the magnet along the AMR bed. Cold fluid pushes the hot fluid toward the hot side heat exchanger until the high temperature zone is expelled.

For the case of the magnet moving while the fluid remains stationary, we note that the temperature will change as the magnetic field is applied, and then change back when the field is removed, producing essentially no change in the temperature of the system before and after exposure to the field. However, if the fluid moves while the magnetic field is moving with respect to the AMR, thermal energy released from the magnetocaloric material by the magnet acting on the regenerator may be transported in front of the moving magnet, behind the moving magnet, or together with the moving magnet.

One analytical method to gain insight into the potential for various modes of FSFM is to assess the performance of systems operating from an initial temperature difference of zero (uniform flat starting temperature) between the "cold end" and the "hot end" of the AMR. To allow meaningful comparisons between the approaches, we model each set of assumptions in the same mathematical model.

Example 1

Model the Conventional Approach of Non-Synchronous Flow

In this case, we first raise the temperature across the bed by applying the magnetic field, then pump cold fluid in from the cold end to the hot end, then lower the temperature by removing the magnetic field, then pump fluid back from the hot end to the cold end.

In this baseline case, 287 joules are removed from the cold side, and 294 joules are discharged at the hot side per cycle (difference is 7 joules). This difference may represent the minimum work required to be done by heat pump in terms of mechanical work to move the magnet, though some experimental verification of this assumption is needed to confirm it. Note that the amount of heat transferred per cycle is much higher for this zero-differential case than for the 25 degree-differential case modeled in FIG. 2 through FIG. 6, in which only 94 joules were transferred.

There are several variables to consider: (1) Ratio of heat capacity of fluid to heat capacity of regenerator material; (2) Ratio of velocity of the fluid to velocity of the magnet motion; and (3) Length of magnet relative to length of the regenerator bed.

The effect is different for each of the three possible cases of FSFM relative velocities. We examine the effects of forward bias, neutral bias, and negative bias in Example 2, Example 3, and Example 4, respectively.

Example 2

Forward Bias, Fluid Moves Faster than Field

In this case, a hot zone emerges from the leading edge of the moving magnet, with the temperature of the hot zone growing progressively higher as the motion proceeds. There is a limit to the height of the hot zone, which is a function both of the relative velocity of the fluid and the magnet, and the heat capacity ratio of the fluid to the regenerator. The trailing cold zone moves forward with the magnet as well, so the fluid gets progressively colder in the cold zone as the motion proceeds. Forward bias produces the sharpest peaks, and the highest absolute values of temperature change from low to high. It is possible to push fluid so quickly, that the cold side temperature "breaks through" the leading edge of the moving magnetic field, a condition that diminishes overall efficiency. In our forward bias example, the velocity of the magnet is 75% of the fluid velocity, and the cold tail pushes about ⅓ of the distance from the trailing edge toward the leading edge of the magnet.

In this case, 291 joules are removed from the cold side, and 322 joules are discharged at the hot side per cycle (difference is 31 joules).

Example 3

Neutral Bias, Fluid Moves at Same Speed as Field

This is the limiting case of forward bias theoretically, but in fact one begins to observe behavior associated with reverse bias synchronization due to the thermal mass of the regenerator and heat transfer fluid. We selected a fluid to regenerator volume ratio of 3:1 (75% porosity) for this model case. A greater ratio of fluid heat capacity to regenerator heat capacity produces less stretching of the hot pulse and of the cold pulse as the field moves across the AMR bed.

In this neutral bias case, the cold side heat transfer is 283.6 joules, and the hot side heat transfer is 295.6 joules (difference is 12 joules).

It is interesting to note that the plateau height for the temperature difference attained in the neutral bias case is almost exactly equal to the isentropic temperature change for the 290 degree starting temperature (delta T is 3.2° K).

Example 4

Reverse Bias, Fluid Moves More Slowly than Field

In the case of reverse bias, the hot and cold temperature zones become much more extended, and flatter compared to the cases of forward or neutral bias. In fact the conventional AMR refrigeration cycle is a special case of a reverse bias system. For this case, again we chose 3:1 fluid: regenerator area, and velocity of fluid is 0.91 velocity of magnet.

In this reverse bias case, the cold side heat transfer is 279.0 joules, and the hot side heat transfer is 294.0 joules (difference is 15 joules).

In summary, refer to Table 1, which provides some of the relevant process simulation results that we described above, for a heat pump application with a zero degree temperature differential starting at 290° K for comparison purposes.

TABLE 1

Zero-degree differential heat pump performance comparison.

| Case | AMR Porosity | (V Flow)/ (V Magnet) | T max | T min | Max Temp Difference | Cooling per cycle, Joules |
|---|---|---|---|---|---|---|
| Conventional | 33% | N/A | 291.5 | 288.5 | 3.0 | 287.0 |
| Positive Bias | 75% | 133% | 294.5 | 286.2 | 8.3 | 291.0 |
| Neutral Bias | 75% | 100% | 293.2 | 287.5 | 5.7 | 283.6 |
| Negative Bias | 75% | 91% | 292.2 | 288.2 | 4.0 | 279.0 |

Note that even though the cooling capacity per cycle is highest only by a small margin for the positive bias FSFM case, the implications for successful construction of practical refrigeration systems are quite profound. First consider the temperature excursions from the starting temperature of 290° K. The fact that the heat must be carried at a lower temperature differential in the conventional design means that a greater flow of heat exchange fluid is required to move the same quantity of heat to the heat exchangers, resulting in a higher mass flow (almost three times greater for conventional versus the positive bias FSFM case). This has important implications with respect to frictional losses due to fluid flow within the AMR, and with respect to pump cost, reliability, and minimum energy requirements for pumps. Further, the heat exchangers can operate more efficiently with a higher temperature differential, and so can be smaller and themselves require less energy at comparable cooling rates, or can achieve greater cooling rates if the heat exchanger limits the rate of energy transfer.

The difference in AMR porosity also has a fairly large effect on the system efficiency, because the ratio of heat capacity of the fluid compared to the heat capacity of the MCE material in the AMR bed is much greater for the FSFM design.

The improved management of heat flow through the system enabled by the present invention, is not limited in application to the conventionally designed active regenerator heat-pump refrigeration systems which operate cyclically and reversibly, requiring the direction of fluid flow through the regenerator to be reversed once per cycle. The flow-synchronous field motion method in accordance with the present invention may also be operated in a constant, non-reversing flow mode, which holds great promise as a basis for the design of modular heat pump stages that can in principle achieve much higher cooling and heating capacity than those based on reversing flow, and would be ideal for large scale industrial refrigeration systems.

Figure 8A:
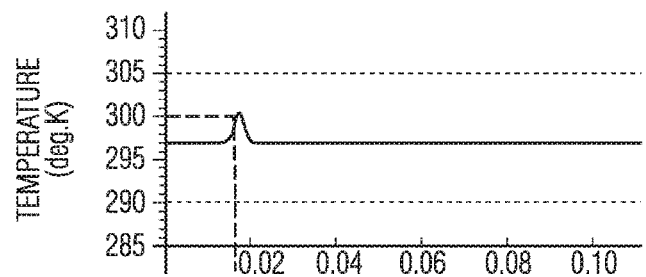
FIGS. 8A through 8G illustrate schematically in eight sequential views the changes in temperature profile within the system during operation of an AMR employing the flow-synchronous field motion method of the present invention, in constant, non-reversing flow mode.
Figure 8B:
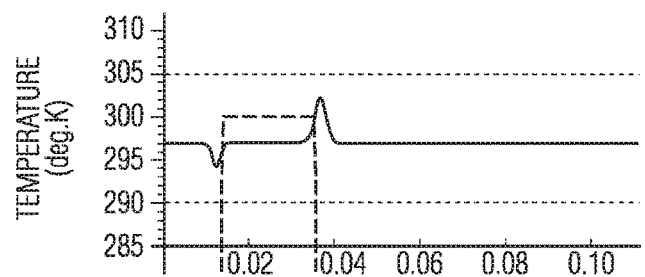
Figure 8C:
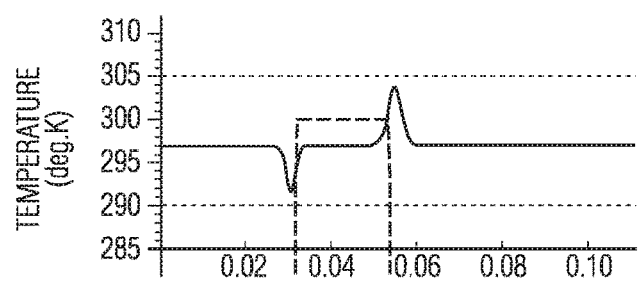
Figure 8D:
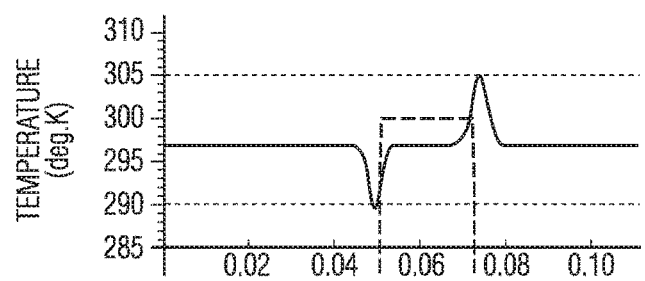
Figure 8E:
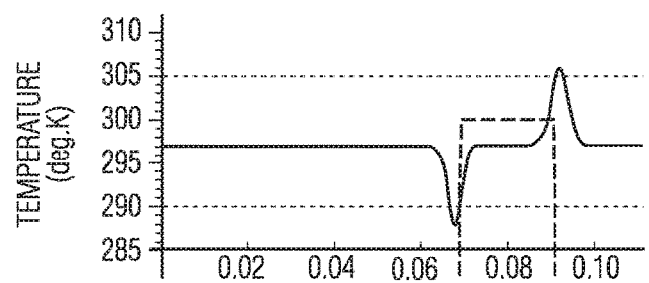
Figure 8F:
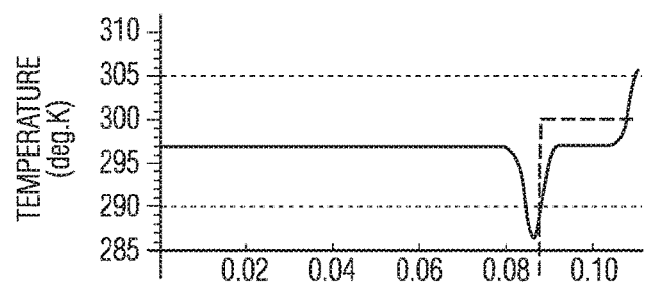
Figure 8G:
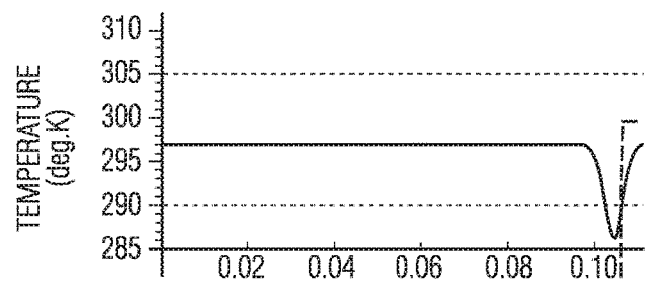

In the constant, non-reversing flow mode, the direction of flow through the AMR remains constant. FIGS. 8A through 8G show the temperature profile evolution for this flow mode. This profile assumes a uniform flat temperature profile along the AMR at the beginning of the cycle, in this case at 297° K. The fluid is water, moving faster than the magnet. We see the development of the hot pulse, as water warmed by the MCE is pushed in front of the moving magnet (FIGS. 8A through 8E). The temperature differential reaches a maximum just before the hot pulse reaches the output side of the AMR (FIGS. 8F and 8G).

In a reversing flow approach, as shown in FIGS. 7G through 7J, the hot pulse would be pushed off the right hand side of the AMR and then the flow direction would reverse, pushing the cold pulse back until it emerged from the left side of the AMR. In that case, the right side is always the "hot side" and the left is always the "cold side" of the AMR.

In the constant flow implementation, shown in FIGS. 8A through 8G, there is an "input side" and an "output side" to the AMR, and for each AMR, the input temperature remains the same. In constant flow mode, flow of the heat exchange fluid always proceeds in the same direction as the motion of the magnetic field along the AMR. The AMR has a single characteristic operating base temperature, and as the magnet proceeds down the length of the AMR, the hot pulse (moving at the front of the moving magnet) gets hotter and wider, and at the same time the cold pulse (moving at the back end of the moving magnet) gets colder and wider.

Figure 9:
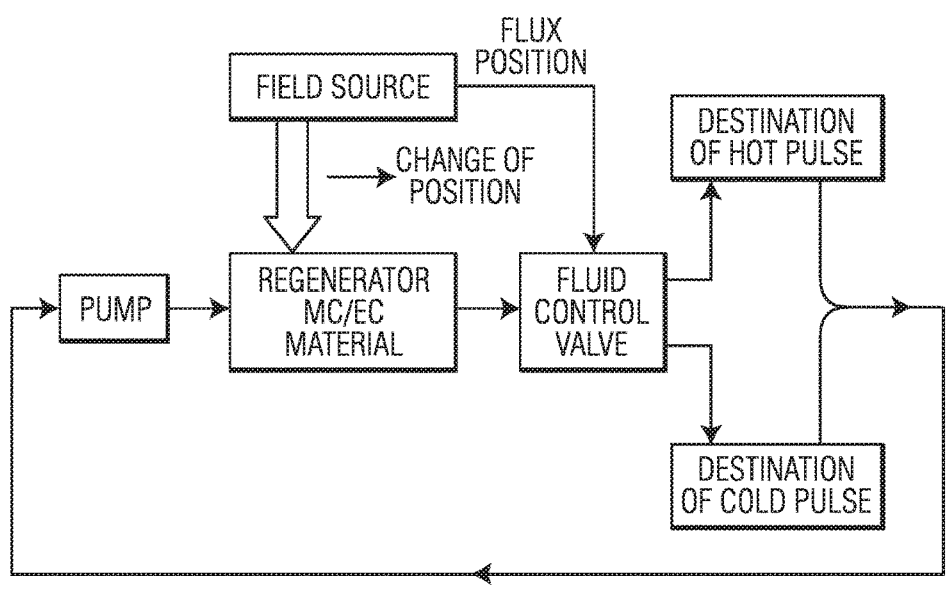
FIG. 9 illustrates schematically a 1-stage design for implementing the flow-synchronous field motion method of the present invention in constant, non-reversing flow mode.

The key to making this approach work in a refrigerator (see FIG. 9) is to collect the cold pulse and direct it to the load to be cooled, and to collect the hot pulse and send it to a heat exchanger where the heat may be transferred to the environment.

Figure 10:
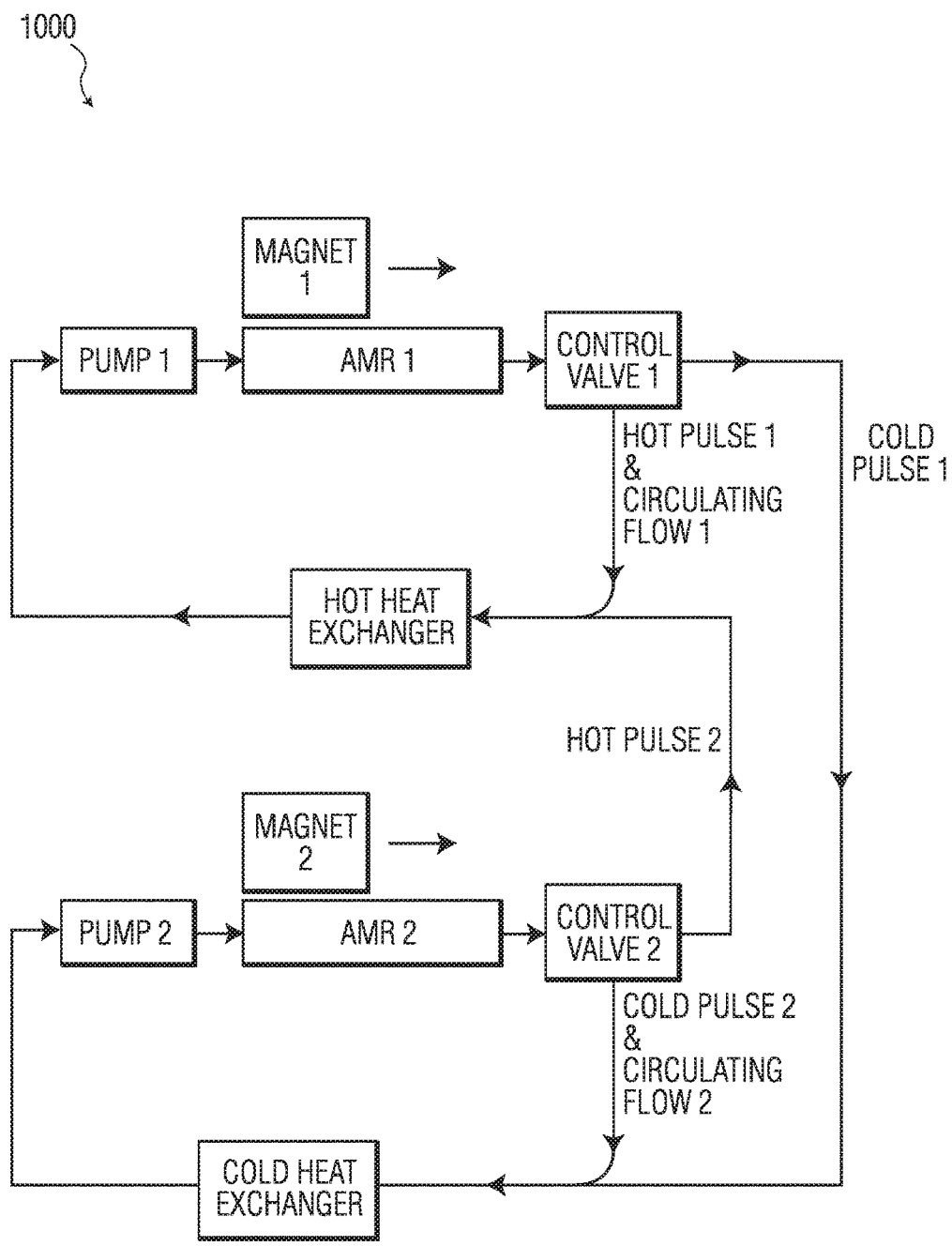
FIG. 10 illustrates schematically a 2-stage design for implementing the flow-synchronous field motion method of the present invention in constant, non-reversing flow mode.

FIG. 10 shows a simple arrangement 1000 for a 2-stage constant flow refrigerator design. AMR1 operates at near-ambient temperature, and sends the hot pulse, together with the circulating flow to a heat exchanger that dumps energy to the environment. AMR2 operates at a lower temperature, and sends its hot pulse back to AMR1. AMR2's hot pulse temperature is approximately equal to AMR1's circulating temperature; and, AMR1's cold pulse temperature is approximately equal to AMR2's circulating temperature.

Many factors contribute to the magnitude of the temperature differential attained between the hot the cold peak. The first factor is the size of the magnetocaloric effect (MCE), which is expressed as the adiabatic temperature change that results from inserting a magnetocaloric material into a magnetic field. The MCE is a function of the material in question (gadolinium in our case), and the amplitude of the applied magnetic field. The second factor is the porosity of the AMR, which is a measure of the ratio of the heat exchange fluid flowing through the AMR to the magnetocaloric material, and the material itself. This ratio must be considered when setting the optimum flow velocity of the fluid with respect to the moving magnet assembly. The third factor is the amount of material in the AMR. The amount of material is proportional to the maximum amount of heat that can be transferred per cycle. The amount of magnetocaloric material in the AMR is equal to the AMR cross-sectional area times its areal density, times its length. The fourth factor is the physical size and amplitude of the magnetic field. The relationship between the size of the magnetic field and the maximum temperature differential is complex. In our models, we find that there is a minimum length for the magnet that can assure that the hot pulse and the cold pulse remain well-separated for a particular length AMR. The fifth factor is the starting temperature of the AMR. The MCE is a very strong function of the temperature at which the magnetic field is applied or removed.

According to results of numerical modeling, the 2-stage constant flow design shown in FIG. 10 can work efficiently for temperature differentials typical of air conditioning systems and refrigerators. We note that in principle, there is no limit to the maximum temperature differential of the hot pulse or the cold pulse, as long as we do not attempt to use an AMR magnetocaloric material outside of the range of temperatures within which the MCE can generate an appreciable temperature change. In fact, each AMR could be made from a material whose Curie temperature is tuned to match the particular recirculation temperature characteristic of the module in question. The system can in fact be applied to freezer applications even using elemental gadolinium as the MCE material. However, for larger temperature differentials we find that there is a need for physically longer AMR's and correspondingly larger permanent magnets to generate the moving fields, though the magnets are still a small fraction of the size that would be required for a conventional magnetic refrigerator design.

Another important advantage to the constant flow FSFM configuration is that because the flow never needs to reverse, it now becomes possible to have more than one magnet moving down a single AMR at one time, creating a sequence of multiple hot pulse and cold pulse flow segments, thereby significantly increasing the watts of cooling capacity of the refrigerator without adding more material to the AMR. This would be particularly helpful for longer AMR's designed to provide a greater single-stage temperature differential.

It is to be understood that certain modifications of the instant invention may be accomplished and yet still fall within the scope of the instant invention. For example, it is possible to use a magnet whose length is equal to the length of the AMR bed, yet still to obtain a benefit such as a greater practical operating temperature differential from application of synchronous flow of heat exchange fluid. Further, it is possible to apply a similar strategy for managing the flow of heat exchange fluid in a device wherein the temperature change occurs as the result of applying an electric field to an electrocaloric material, such as ferroelectric polymers. Thus it is possible in general to apply this method of operation advantageously to many prior art magnetic refrigerator designs and possible electrocaloric material refrigerator designs without departing from the principles of the instant invention.

What is claimed is:

1. A method for operating an active magnetocaloric or electrocaloric regenerator, the regenerator comprising magnetocaloric or electrocaloric material and fluid in contact with the material, the method comprising:
  a. acting upon the material to create at one time a plurality of non-overlapping volumes of the fluid; wherein
    (1) the fluid acted upon occupies at the time a first fluid flow path through a homogeneous portion of the material, the fluid being in motion in one direction at the time;
    (2) a first volume of the plurality has a first temperature at a first position of the path;
    (3) a second volume of the plurality has a second temperature at a second position of the path, the second position is a first distance from the first position in the direction, the second temperature is less than the first temperature;
    (4) a third volume of the plurality has a third temperature at a third position of the path, the third position is a second distance from the first position in the direction, the second distance being greater than the first distance, the third temperature is greater than the first temperature;
    (5) a fourth volume of the plurality has a fourth temperature at a fourth position of the path, the fourth position is a third distance from the first position in the direction, the third distance is greater than the second distance, the fourth temperature is greater than the third temperature;
    (6) a fifth volume of the plurality has a fifth temperature at a fifth position of the path, the fifth position is a fourth distance from the first position in the direction, the fourth distance is greater than the third distance, the fifth temperature is less than the fourth temperature, the fifth temperature is greater than the third temperature;
  b. pumping the fluid through the material in the direction;
  c. directing the second volume to a first destination apart from the regenerator so that the second volume receives heat; and
  d. directing the fourth volume to a second destination apart from the regenerator so that the fourth volume provides heat.

2. The method of claim 1, wherein acting comprises causing more magnetocaloric or electrocaloric effect in the regenerator at the third position than at the fourth position.

3. The method of claim 1, wherein the fourth volume heats the regenerator at the fourth position.

4. The method of claim 1, wherein:
  a. the regenerator comprises magnetocaloric material; and
  b. acting further comprises passing magnetic flux through the magnetocaloric material.

5. The method of claim 1, wherein:
  a. the regenerator comprises electrocaloric material; and
  b. acting further comprises passing electric flux through the electrocaloric material.

6. An apparatus comprising:
  a. a first regenerator comprising homogeneous magnetocaloric or electrocaloric material;
  b. a first heat exchanger;
  c. a first pump, wherein
    (1) the first pump is in fluid communication with the first heat exchanger to receive a fluid from the first heat exchanger; and
    (2) the first pump is in fluid communication with the first regenerator to move the fluid through the first regenerator so that the first regenerator provides the fluid;
  d. a first field source that provides flux through the material to create, in the fluid provided by the first regenerator, a first hot pulse and a first cold pulse;

e. a second regenerator comprising homogeneous magnetocaloric or electrocaloric material;
f. a second heat exchanger;
g. a second pump, wherein
   (1) the second pump is in fluid communication with the second heat exchanger to receive the fluid from the second heat exchanger; and
   (2) the second pump is in fluid communication with the second regenerator to move the fluid through the second regenerator so that the second regenerator provides the fluid;
h. a second field source that provides flux through the second material to create, in the fluid provided by the second regenerator, a second hot pulse and a second cold pulse;
i. a first fluid control valve that receives fluid provided by the first regenerator; and
j. a second fluid control valve that receives fluid provided by the second regenerator; wherein
k. the first fluid control valve directs the first hot pulse into a first stream of the fluid received by the first heat exchanger and directs the first cold pulse away from the first stream;
l. the first control valve further directs the first cold pulse into the second stream;
m. the second fluid control valve directs the second hot pulse into a second stream of the fluid received by the second heat exchanger and directs the second cold pulse away from the second stream; and
n. the second control valve further directs the second hot pulse into the first stream.

7. A method for operating an active magnetocaloric or electrocaloric regenerator, the regenerator comprising magnetocaloric or electrocaloric material and fluid in contact with the material, the method comprising:
  a. acting upon the material to create at one time a plurality of non-overlapping volumes of the fluid; wherein
    (1) the fluid acted upon occupies at the time a first fluid flow path through a homogeneous portion of the material, the fluid being in motion in one direction at the time;
    (2) a first volume of the plurality has a first temperature at a first position of the path;
    (3) a second volume of the plurality has a second temperature at a second position of the path, the second position is a first distance from the first position in the direction, the second temperature is greater than the first temperature;
    (4) a third volume of the plurality has a third temperature at a third position of the path, the third position is a second distance from the first position in the direction, the second distance being greater than the first distance, the third temperature is less than the first temperature;
    (5) acting comprises applying a flux to a portion of the fluid flow path that does not include the first position, the second position, or the third position;
  b. pumping the fluid through the material in the direction;
  c. directing the second volume to a first destination apart from the regenerator so that the second volume provides heat.

* * * * *